United States Patent [19]

Auteri

[11] Patent Number: 5,239,609
[45] Date of Patent: Aug. 24, 1993

[54] MEANS FOR ROUTING BUFFER TUBE TYPE FIBER OPTICAL CABLE

[75] Inventor: Robert P. Auteri, Manorville, N.Y.

[73] Assignee: Porta Systems Corp., Syosset, N.Y.

[21] Appl. No.: 845,372

[22] Filed: Mar. 3, 1992

[51] Int. Cl.$^5$ ............................................. G02B 6/00
[52] U.S. Cl. .................................. 385/136; 385/137; 385/147
[58] Field of Search ............... 385/134, 136, 137, 147, 385/54, 55, 62, 63, 65, 66

[56] References Cited

U.S. PATENT DOCUMENTS

| | | | |
|---|---|---|---|
| 4,305,642 | 12/1981 | Bloodworth, Jr. et al. | 385/134 |
| 4,744,629 | 5/1988 | Bertoglio et al. | 385/137 X |
| 4,884,862 | 12/1989 | Kofod | 385/55 |

OTHER PUBLICATIONS

A.T.T. Practice Standard #631-299-110. Feb. 1988.
A.T.T. Practice Instruction Sheet #633-501-101-141 Aug. 1984.

Primary Examiner—Brian Healy
Assistant Examiner—S. W. Barns
Attorney, Agent, or Firm—Charles E. Temko

[57] ABSTRACT

A means and method for routing and managing buffered tube type fiber optical cable, particularly outside plant cable to an optical fiber cabinet or similar structure. The disclosure describes novel clamping elements engaging the outside plant cable which serve to separate the contained optical fibers for guidance in individual paths to a point of connection, and provide a mounting point at the clamping elements prior to separation. The clamping elements are transparent, enabling inspection and identification of individual fiber circuits.

3 Claims, 1 Drawing Sheet

MEANS FOR ROUTING BUFFER TUBE TYPE FIBER OPTICAL CABLE

BACKGROUND OF THE INVENTION

This invention relates generally to the field of fib optic transmission, and particularly to an improved means and method for routing and managing semi-rigid buffer tube type optical fiber cable, typically outside plant cable upon entering a central office.

Traditionally, outside plant cable carrying multiple subscriber lines has been the copper wire type in which the individual conductors are relatively sturdy, and capable of considerable flexing and binding without damage. With the advent of fiber optical cable in various forms, most new installations do not use copper cables. However, the relative fragility of fiber optic conductors has made necessary the utilization of entirely new techniques for routing and handling fiber optic cables within the central office and other areas of interconnection. The principal requirement is the need for immobilizing individual fibers over the major portion of an assigned path.

SUMMARY OF THE INVENTION

Briefly stated, the invention contemplates the provision of an improved means and method to enable service personnel to block, manage, distribute and protect outside plant cable of the fiber optic semi-rigid buffer tube type in a simple expedient fashion which will permit the ready identification of individual conductors after installation and permit ready service and replacement of components when required. The means includes a two-piece clamp of planar configuration which may be mounted upon a planar surface to retain the end of the outside plant cable, and provide guiding passages for individual fiber conductors comprising the cable. The clamp is substantially transparent to permit the ready identification of individual fibers, and also, the observing of the condition of the fibers, fiber guiding tubes and injected sealant.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
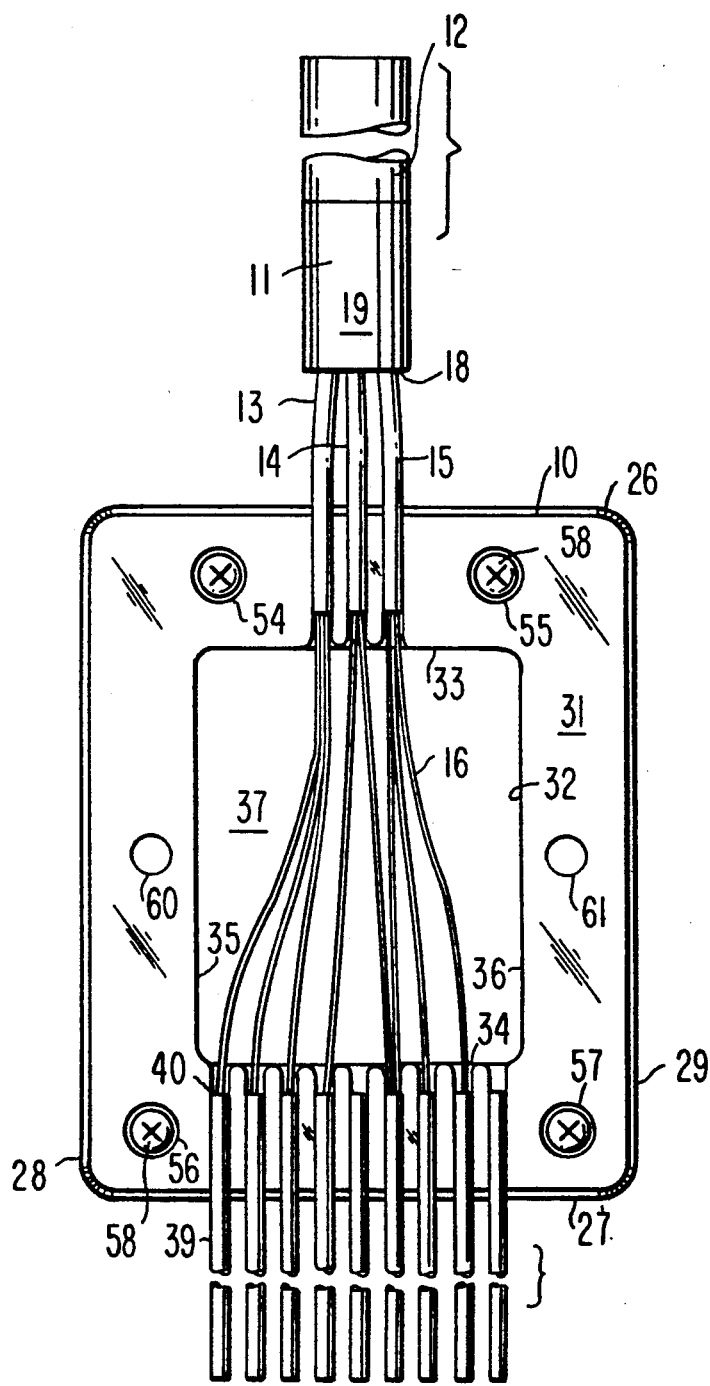
FIG. 1 is a front elevational fragmentary schematic view showing an embodiment of the invention.
Figure 2:
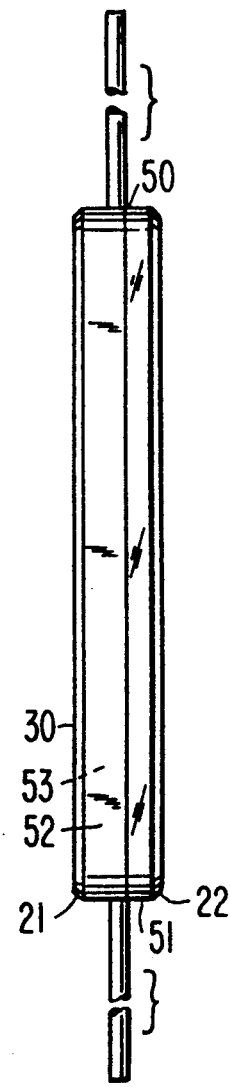
FIG. 2 is a schematic side elevational view as seen from the right hand portion of FIG. 1.

In accordance with the invention, the device, generally indicated by reference character 10, is shown in FIG. 1 in operative association with outside plant cable 11 having an outer shield 12 enclosing buffer tubes 13, 14, and 15 from which extend plural optical fibers 16. The shield 12 is removed below a free end 18 immediately below a clamping area 19 engaged by a conventional clamp known in the art (not shown).

The device 10 comprises a two part housing which includes a base element 21 and a cover element 22 formed of clear synthetic resinous material, such as polycarbonate, in congruent relation therewith.

The base element 21 is approximately ⅜ inch thick, and is bounded by a first end edge 26, a second end edge 27, side edges 28 and 29, an outer surface 30, and an inner surface 31. Extending from the inner surface 31 is a recess 32 terminating in a first or entry end 33 and a second or exit end 34, and bounded by sides 35 and 36 as well as a lower planar surface 37. The second end 34 is adapted to retain a plurality of flexible buffer tubes 39 which are clamped by the cover element 22 and which serve to guide the fibers 16 to a point of interconnection. The inner ends 40 thereof are positioned well within the recess, to enable the injection of a blocking sealant (not shown) of known type, after the fibers have been inserted therethrough.

The cove element 22 is formed of transparent synthetic resinous material and may be substantially thinner. It is bounded by first and second end edges 50 and 51, as well as side edges 52 and 53. A pair of upper bores 54 and 55 and lower bores. 56 and 57 extend through both the base and cover elements, to enable the elements to be maintained in abutted relation through the use of machine screws 58. A pair of centrally disposed bores 60 and 61 is also continuous through both elements, and enables the device 10 to be mounted on a stable surface (not shown).

Installation of the device 10 follows established fiber art installation techniques. After securing the clamping area 19, the exposed buffer tubes 13, 14, 15 are removed, leaving an appropriate length of exposed fibers 16. These fibers are then passed through flexible plastic tubes 39. Both the buffer 13, 14, 15, and the flexible plastic tubes 39 may be temporarily secured using an adhesive such as cyanoacrylate. Next, a blocking sealant thereafter is injected into the free ends of the tubes 40, and the device closed by the placement of the cover element 22 and the engagement of the screws 58. The device 10 is thereafter anchored to a fixed surface using screws inserted through the bores 60 and 61.

Once installed, it will be observed that the fibers 16 are open to continuous visual inspection, because of the transparency of the device, as is the general condition of all parts of the conductors disposed within the recess 32.

It may thus be seen that I have invented novel and highly useful improvements in fiber optic clamping devices particularly suited to semi-rigid buffer tube type cables, in which the routing and management of individual fiber optic fibers is materially simplified by providing a mountable clamp made of transparent materials and defining an enclosed recess which is at all times visible to service personnel. The device may be fabricated at relatively low cost of manufacture using injection molding techniques, with a minimum of machining, and may be fabricated in a variety of sizes, depending upon the size of the cable to be accommodated.

I wish it to be understood that I do not consider the invention to be limited to the precise details of structure shown and set forth in this specification, for obvious modifications will occur to those skilled in the art to which the invention pertains.

I claim:

1. An improved clamping device for buffer tube type fiber optic cables comprising: a planar base element and a planar cover element selectively interconnected in substantially congruent relation; said base element having inner and outer parallel surfaces, and defining a recess therein extending from said inner surface, and having a cable entry opening at one end of said recess and a cable outlet opening at an opposite end thereof; said cover element having base interconnecting means and adapted to overlie said recess and clamp cable buffer tubes disposed therein; said outlet opening having plural flexible buffer tubes disposed therein and extending within said recess, and means for securing said base and cover element to a fixed surface; whereby buffer tubes emanating from a free end of said buffer tube-type cable may be positioned within said entry opening in said recess to be clamped between said and cover elements, and individual optical fibers emanating from said clamped tubes may be conducted to said tubes positioned in said exit end of said recess to be guided to points of interconnection.

2. A clamping device in accordance with claim 1, in which at least said cover element is formed from transparent material.

3. A device in accordance with claim 1 in which the base and cover elements are formed of transparent material.